United States Patent

[11] 3,525,350

| [72] | Inventor | William S. Hosek<br>Mount Tabor, New Jersey |
|---|---|---|
| [21] | Appl. No. | 744,358 |
| [22] | Filed | July 12, 1968 |
| [45] | Patented | Aug. 25, 1970 |
| [73] | Assignee | Thiokol Chemical Corp.<br>Bristol, Pennsylvania<br>a corporation of Delaware |

[54] RE-USABLE HERMETICALLY SEALED VALVE
7 Claims, 6 Drawing Figs.

[52] U.S. Cl.......................................................... 137/68,
251/62, 251/211
[51] Int. Cl.......................................................... F16k 13/04
[50] Field of Search........................................... 137/68,
269.5, 329.01; 251/210, 211, 228, 62

[56] References Cited
UNITED STATES PATENTS

| 845,213 | 2/1907 | Bazin............................. | 251/211 |
| 3,141,470 | 7/1964 | La Fontaine................. | 137/68 |
| 3,397,712 | 8/1968 | Boroson....................... | 137/68 |

Primary Examiner— William F. O'Dea
Assistant Examiner— Richard Gerard
Attorney— William R. Wright Jr.

ABSTRACT: This invention provides a hermetically sealed valve which can be re-used as a valve because its closure poppet is automatically directed to a second seat unhampered by the torn edge of the ruptured hermetic seal. A large mechanical advantage is provided to break the hermetic seal and pressure and mechanical forces are combined to assist the sealing effect between the valve cover and second seat.

INVENTOR.
WILLIAM S. HOSEK
BY
William R. Wright
AGENT

INVENTOR.
WILLIAM S. HOSEK

INVENTOR.
WILLIAM S. HOSEK

INVENTOR.
WILLIAM S. HOSEK

INVENTOR.
WILLIAM S. HOSEK

RE-USABLE HERMETICALLY SEALED VALVE

The present invention relates to a valve for opening and closing fluid flow passages and in particular to one which is initially hermetically sealed so that fluid cannot pass downstream until the seal is broken but which also provides for repeated operation and re-use of the valve.

It is important in the field of rocket propulsion, for example, to ensure that no propellants pass downstream prior to actual desired operation of the rocket motor in order that the rocket motor system may be free of the fire, explosion, contamination and corrosion hazards which would otherwise be present if propellants were to be allowed downstream of the valve during storage of the rocket motor system. Hermetically sealed valves can for the same reasons, also be used for sealing various other chemicals in fluid systems until such time as their actual use is desired.

Valves of the hermetic type are ordinarily of the "one shot" variety in which the seal is broken when the valve is opened and the valve then cannot be re-used until the hermetic element is replaced or, if reusable at all, the seal is ineffective because of the torn edge of the hermetic element. The present invention provides a valve which can be re-used effectively after the seal is broken because it employs a second seat for the valve element, which seat carries an effective sealing means.

It is, therefore, an object of the present invention to provide a hermetically sealed valve which can be effectively re-used as a valve after the hermetic seal has been broken.

It is also an object of the present invention to provide a valve of the foregoing type which provides a straight through flow path for low pressure drop.

It is also an object of the present invention to provide a valve of the foregoing type which utilizes a large mechanical advantage for opening the hermetic seal and thus becomes operable with a relatively small input of control pressure.

It is also an object of the present invention to provide a valve of the foregoing type which includes a hermetically sealed valve seat and poppet and a second valve seat which is capable of repeatedly receiving the poppet in sealed relationship thereto and a mechanical guide to ensure seating thereon.

Other objects and advantages will be apparent from the description and drawings which follow:

Figure 1:
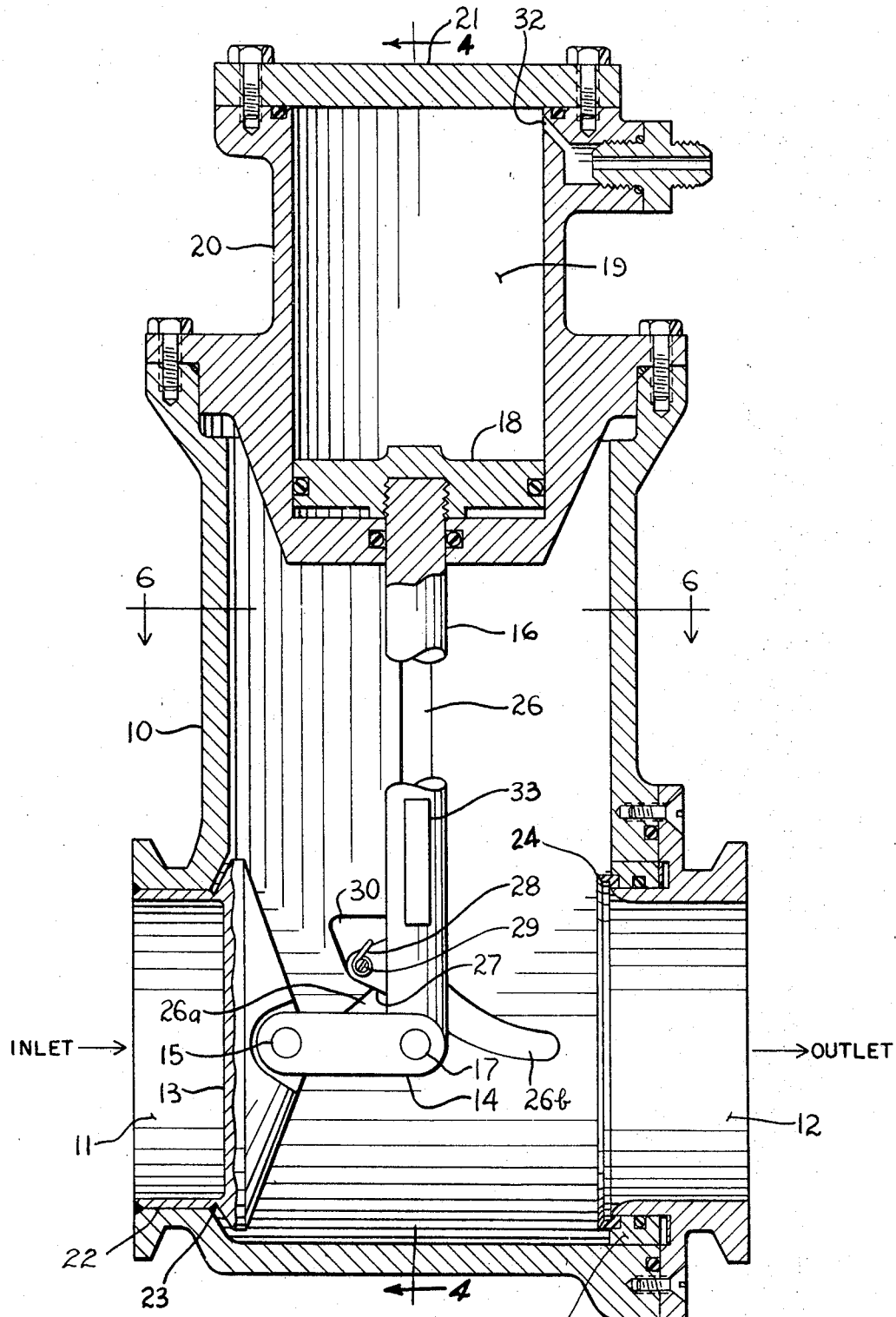
FIG. 1 is a partial cross-sectional view of the valve showing the hermetic seal intact before the valve is operated.
Figure 4:
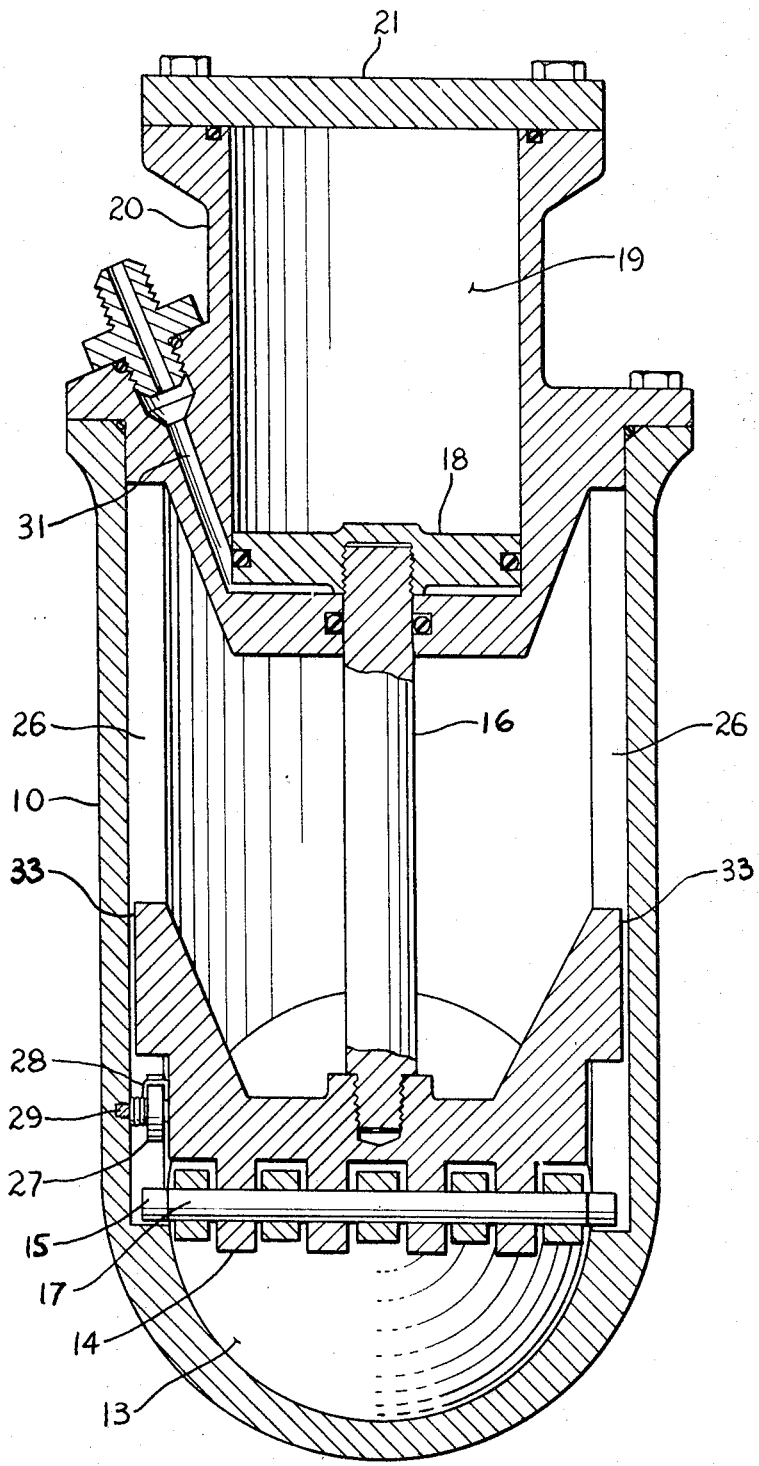
FIG. 4 is a partial cross-sectional view showing the valve in the closed position and viewed from the right hand side with respect to FIG. 1.
Figure 5:
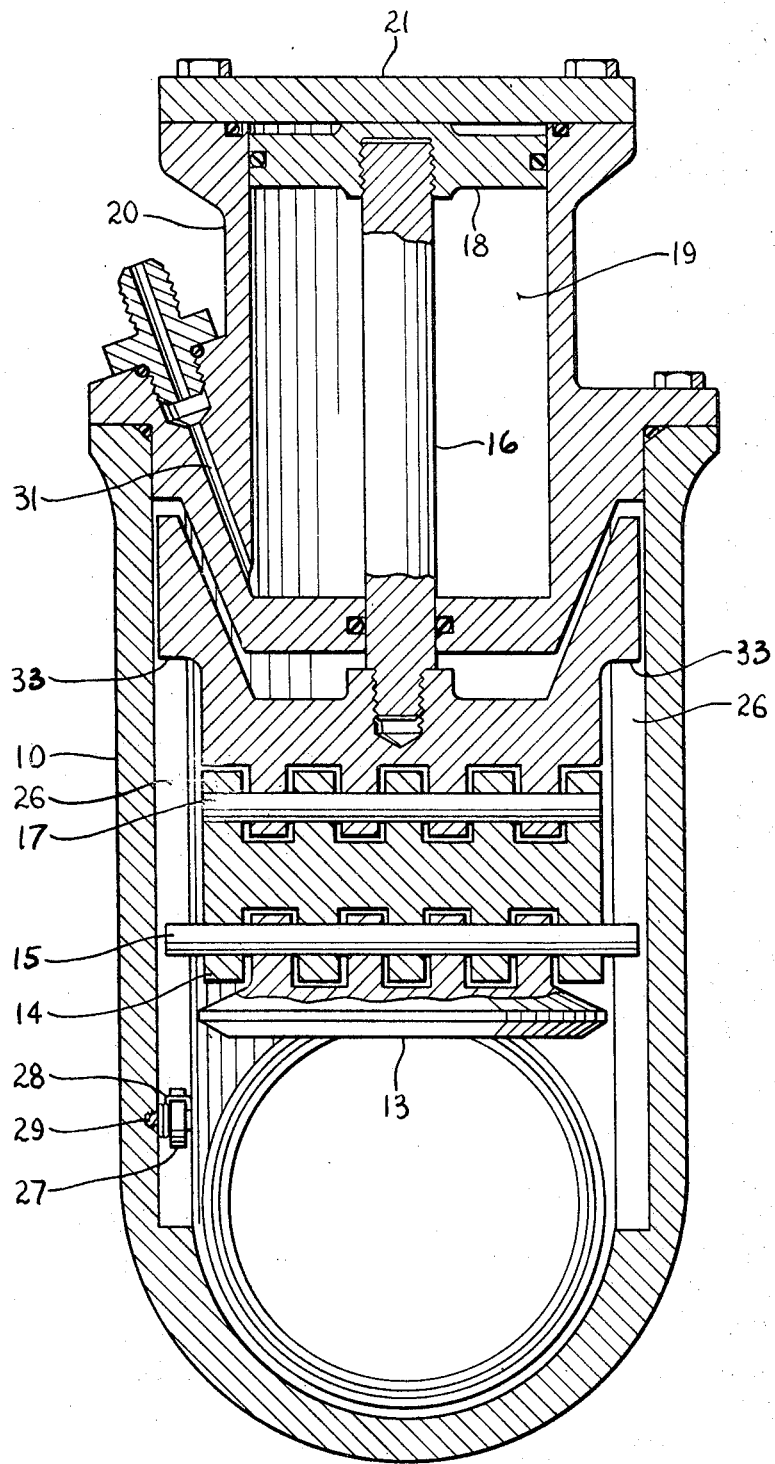
FIG. 5 is a partial cross-sectional view showing the valve in the open or "full-flow" position and viewed from the left hand side with respect to FIG. 2.
Figure 6:
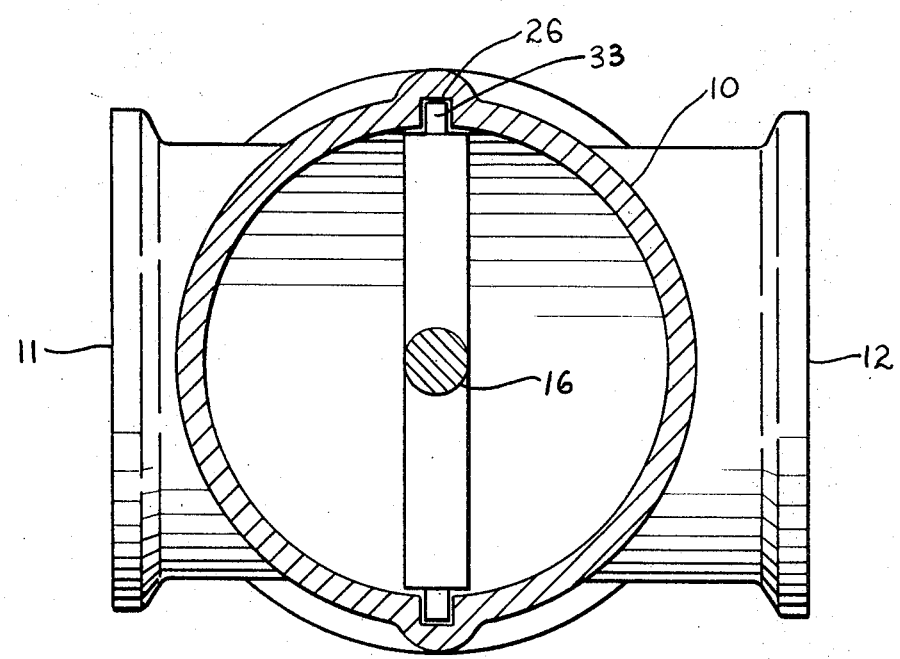
FIG. 6 is a cross-sectional view looking downward from the station indicated in FIG. 1 and showing the track which directs the path of the poppet and guide.

With reference to FIG. 1, the valve includes a body or housing 10 having an inlet 11, an outlet 12, a valve cover or poppet 13 and a pressure operated mechanical linkage. This linkage includes toggle link 14 pivotally attached to poppet 13 by hinge 15 pivotally attached to guide 33 by hinge pin 17 and through guide 33 fixedly attached to piston rod 16. Piston rod 16 terminates in a piston 18 slidable in a cylindrical chamber 19 defined by housing 20 and cover plate 21 and fluid pressure from a suitable source (not shown) is supplied selectively to chamber 19 either under or over piston 18 as desired through ports 31, 32 (see 31 in FIG. 4).

As will be seen at the left hand side of FIG. 1, inlet 11 is initially hermetically sealed by skirt or sleeve 22 which is integral with poppet 13 and is welded in place in inlet 11 by a continuous weld to provide a hermetic seal. The skirt 22 is deeply scored at 23 in an annular manner to provide a weakened cross-section at that point.

Outlet 12 is open as shown but is provided with a seal 24 adapted to seat on the bevelled face of poppet 13 as will be described later in this specification and held in place by seat or ring 25. This seal 24 and seat ring 25 combination can be termed a downstream or second seat.

The hinge pin 15 associated with poppet 13 extends outwardly from the hinge and projects into tracks or grooves 26 formed in the wall of housing 10, one at each end of hinge pin 15. Each of these tracks has a straight upper portion but at its lower end splits into two circularly arcuate portions or legs 26a, 26b, as shown clearly in FIG. 2 and designated as first leg 26a and second leg 26b. Near the junction of these two legs is a spring-loaded switch 27, the spring being designated as 28, with switch 27 pivoted at 29 and adapted to swing upwardly against spring 28 into recess 30 where it is stopped by the wall of recess 30 with its underside serving as a portion of track 26a. Switch 27 is, however, normally in the position shown in FIG. 2 and is held in that position by spring 28 and the lower side of recess 30.

Figure 2:
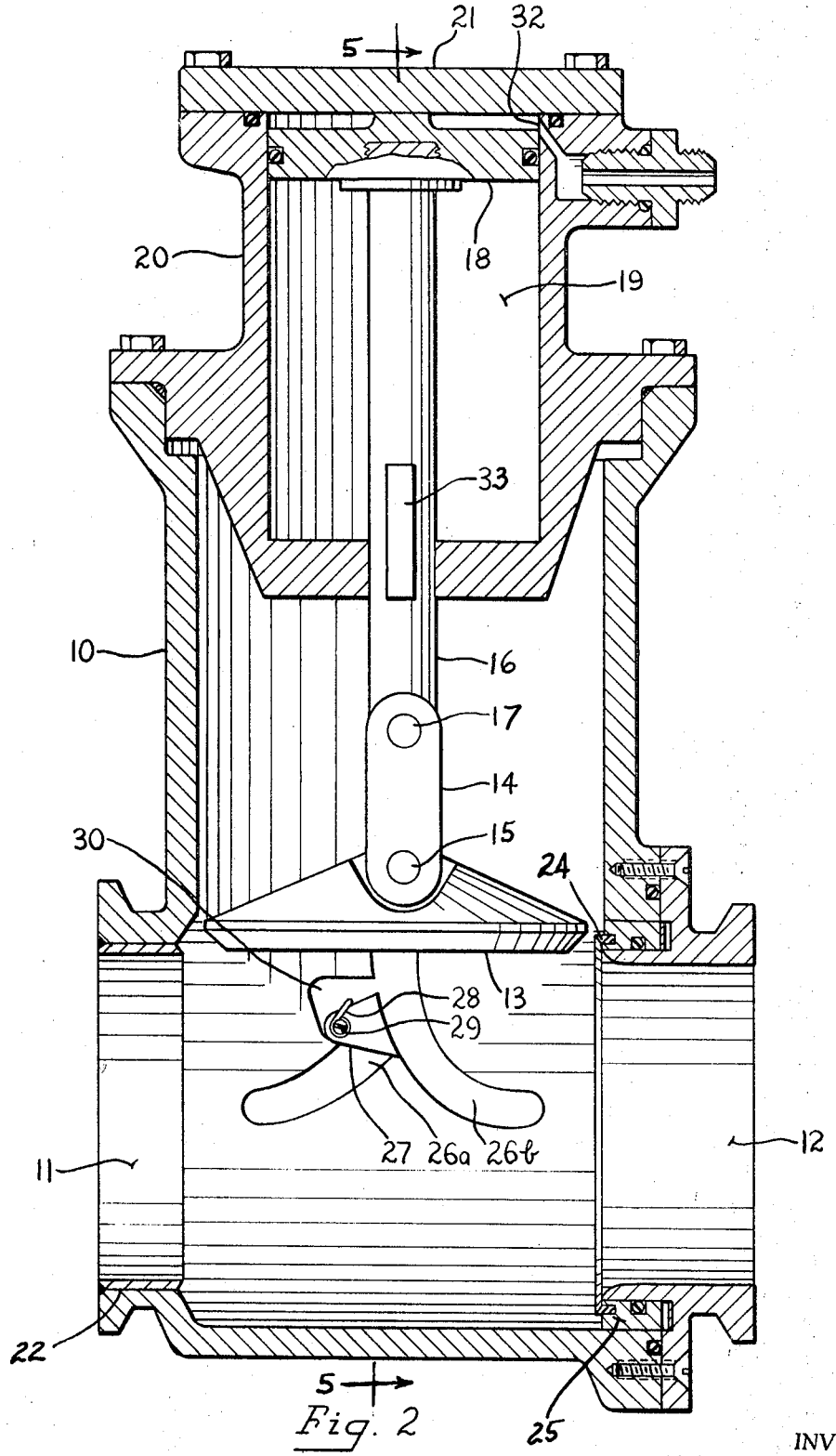
FIG. 2 is a partial cross-sectional view of the valve after the hermetic seal has been opened and showing the poppet removed from the flow path.
Figure 3:
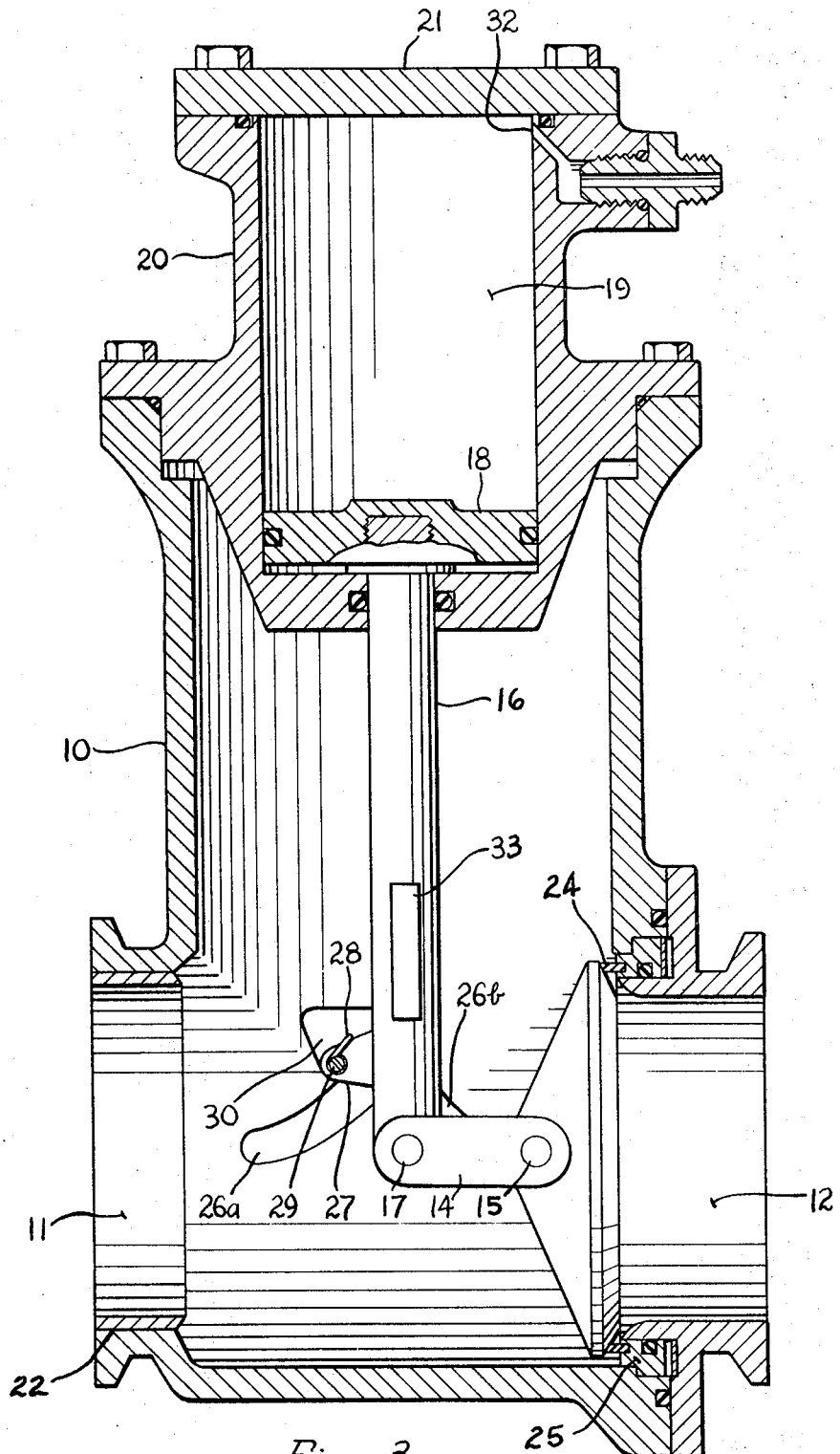
FIG. 3 is a partial cross-sectional view showing the valve re-closed with the poppet in place on the second seat.

In operation, fluid pressure is applied to the under side of piston 18 in FIG. 1 through pressure inlet 31, thus causing piston 18 to move upward in chamber 19 and pull rod 16 upward with it. This action causes attached rod guide 33 to move upward in the straight portion of track 26 and prevents lateral motion of rod 16. At the same time that rod 16 moves upward, a strong tensile force is applied to valve cover 13 by the toggle action of link 14 and, since the hermetic seal is already weakened at 23 by an annular score mark, it now breaks at this score line and valve cover 13 is freed, thus opening the valve to fluid flow in the direction of the arrow. Piston 18 continues to rise in chamber 19 and as it does so hinge pin 15 follows along in leg 26a of track 26 and pushes switch 26 back into recess 30 until it is stopped by the wall of the recess and the switch's lower edge becomes, in effect, part of the track. The extended end of hinge pin 15 then passes over it and the switch is urged by spring 28 back into its original position (see FIG. 2) in which its right hand edge becomes part of track leg 26b. The lower edge of recess 30 acts as a stop to prevent further movement. The piston 18, rod 16, guide 33, link 14 and poppet 13 now continue their upward motion until piston 18 reaches the full extent of its travel and poppet 13 is fully up and completely out of the path of fluid flow through the valve from inlet 11 to outlet 12 as shown in FIG. 2.

When the valve is to be re-closed, fluid pressure is applied to the upper side of piston 18 moving it and its associated parts downward. As the extended portion of hinge pin 15 reaches switch 27 in its travel down track 26, it is now directed by the right hand face of switch 27 into track leg 26b which directs it and valve cover 13 onto seat 24, the force of the toggle action produced through link 14 pressing it firmly in place. Further operation of the valve to open it will simply move poppet 13 away from seat 24 and up out of the path of flow. Subsequent operation to re-close the valve will simply return cover 13 to seat 24 because the switch will remain in the same position as before, i. e. directing hinge pin 15 into track leg 26b.

The provision of a second seat makes it unnecessary to try to re-seat poppet 13 on its original seat which has been broken off at the score line 23 leaving a somewhat ragged edge upon which it would be difficult to effect a good seal. Furthermore, the poppet 13 when closed in its new location is on the downstream side of the valve so that the pressure of the fluid in the valve body 10 will tend to force it even more strongly against seat 35 to help keep it fluid tight. Also, with the provision of this second seat, the valve can be opened and shut repeatedly as discussed earlier in this specification.

I claim:

1. A valve including, in combination, a valve body having an inlet port and an outlet port, a poppet, a hermetic seal hermetically sealing said poppet to said inlet port, mechanical means for breaking said hermetic seal, means for then retracting said poppet from the inlet port, means for thereafter directing the poppet to a position covering the outlet port, a re-usable seal about the periphery of said outlet port and between it and the poppet, and mechanical means for holding said poppet firmly against said seal to close the outlet.

2. The invention set forth in claim 1 with the means for retracting the poppet from the inlet port comprising an actuator, toggle linkage attached thereto and to the poppet, at least one track having a straight portion and at its lower end a first track leg directed toward the inlet and a second track leg directed toward the outlet, both joining and communicating with said straight track, and guide means associated with the linkage adapted to follow said first track leg and track as the poppet is retracted.

3. The invention set forth in claim 2 with said guide means comprising a hinge pin extended into said track and connecting the poppet and toggle link.

4. The invention set forth in claim 3 with a switch in the track substantially at the junction of the first and second track legs and automatically operable upon full retraction of the poppet to block said first track leg and to open said second track leg.

5. The invention set forth in claim 4 with the switch comprising a pivoted spring loaded member interposed in the first track leg and free to swing upwardly out of the path of the hinge pin as it is struck thereby and to return to its original position after the passage thereof, and the upper edge of said member being shaped to conform to the contour of the second track leg.

6. The invention set forth in claim 1 with the hermetic seal being integral with the poppet.

7. The invention set forth in claim 6 with the hermetic seal having a skirt extended into said inlet and continuously welded therein, and a score mark about the periphery of said skirt.